US010402623B2

United States Patent
Zhang et al.

(10) Patent No.: US 10,402,623 B2
(45) Date of Patent: Sep. 3, 2019

(54) LARGE SCALE CELL IMAGE ANALYSIS METHOD AND SYSTEM

(71) Applicant: METAL INDUSTRIES RESEARCH & DEVELOPMENT CENTRE, Kaohsiung (TW)

(72) Inventors: Jia-Hong Zhang, Changhua County (TW); Yan-Jun Chen, Kaohsiung (TW); Yu-Fen Kuo, Pingtung County (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 1 day.

(21) Appl. No.: 15/826,700

(22) Filed: Nov. 30, 2017

(65) Prior Publication Data

US 2019/0163950 A1    May 30, 2019

(51) Int. Cl.
| | |
|---|---|
| *G06K 9/00* | (2006.01) |
| *G06T 7/11* | (2017.01) |
| *G06T 7/136* | (2017.01) |
| *G06T 7/194* | (2017.01) |
| *G06K 9/46* | (2006.01) |
| *G06T 7/00* | (2017.01) |

(52) U.S. Cl.
CPC ....... *G06K 9/0014* (2013.01); *G06K 9/00147* (2013.01); *G06K 9/4647* (2013.01); *G06T 7/0012* (2013.01); *G06T 7/11* (2017.01); *G06T 7/136* (2017.01); *G06T 7/194* (2017.01); *G06T 2207/20081* (2013.01); *G06T 2207/20116* (2013.01); *G06T 2207/30024* (2013.01)

(58) Field of Classification Search
CPC ............. G06K 9/0014; G06K 9/00147; G06K 9/4647; G06T 7/136; G06T 7/194; G06T 7/11; G06T 7/0012; G06T 2207/20081; G06T 2207/20116; G06T 2207/30024
See application file for complete search history.

(56) References Cited

U.S. PATENT DOCUMENTS

| | | | |
|---|---|---|---|
| 4,965,725 A | 10/1990 | Rutenberg | |
| 5,257,182 A | 10/1993 | Luck et al. | |

(Continued)

FOREIGN PATENT DOCUMENTS

| | | |
|---|---|---|
| CN | 102831607 A | 12/2012 |
| TW | I366108 B | 6/2012 |

*Primary Examiner* — Xin Jia
(74) *Attorney, Agent, or Firm* — CKC & Partners Co., LLC

(57) ABSTRACT

A large scale cell image analysis method and system are provided. The method includes: obtaining a cell image; performing a region segmentation process; and performing a feature calculation process. The region segmentation process includes: performing a statistical intensity algorithm according to the cell image to calculate a first threshold and a second threshold; dividing the cell image into a background region and a cell region according to the first threshold; performing an average intensity process according to the cell region to calculate a third threshold and a fourth threshold; and dividing the cell region into a cytoplasmic region and a nucleus region according to the third threshold and the fourth threshold. The feature calculation process calculates at least one feature at least according to the cell region, the nucleus region, and the cytoplasmic region.

12 Claims, 2 Drawing Sheets

(56) References Cited

U.S. PATENT DOCUMENTS

| | | | |
|---|---|---|---|
| 7,050,620 B2 | 5/2006 | Heckman | |
| 7,689,038 B2 | 3/2010 | Zahniser | |
| 7,949,181 B2 | 5/2011 | Padfield et al. | |
| 8,077,958 B2 | 12/2011 | Qian et al. | |
| 9,122,907 B2 | 9/2015 | Lee et al. | |
| 2013/0071003 A1* | 3/2013 | Wirtz | G06K 9/00127 |
| | | | 382/133 |
| 2013/0230230 A1* | 9/2013 | Ajemba | G06T 7/0012 |
| | | | 382/133 |
| 2016/0210534 A1* | 7/2016 | Padubrin | G06K 9/48 |
| 2017/0372117 A1* | 12/2017 | Bredno | G06K 9/0014 |

\* cited by examiner

LARGE SCALE CELL IMAGE ANALYSIS METHOD AND SYSTEM

BACKGROUND

Field of Invention

The present invention relates to a large scale cell image analysis method. More particularly, the present invention relates to a large scale cell image analysis method and a large scale cell image analysis system.

Description of Related Art

Cervical cancer is one of the malignant tumor diseases for women. At present, the precancerous lesions may be effectively detected through the simple and cheap screening method, such as Liquid-based monolayer smear, thereby effectively reducing the incidence and the mortality of cervical cancer. However, traditional screening method only provide subjective qualitative analysis, and the manual screening method is easily misjudged due to human factors, and the low efficiency of the manual screening method does not meet the requirement of the market.

Objective quantitative analysis of the pap smears through the computer-assisted imaging method has become the trend of medical diagnosis. However, the conventional computer-assisted imaging method needs a medical staff to visually judge at first, and then to select the regions of interest (ROI) or the regions having potential abnormality. Finally, the regions are analyzed through the computer. Therefore, the high risk of the human misjudgment or neglection is existed. Furthermore, overlap of the cells of the pap smear or over-intensive cells of the pap smear often occur, which may result in analytical error.

SUMMARY

In the invention, a large scale cell image analysis method and a large scale cell image analysis system are provided. The large scale cell image analysis method analyzes the large scale cell images. In contrast, traditional analysis method analyzes the selected regions or even single cells. The large scale cell image analysis method may effectively improve the problem of accuracy of screening result due to human factors.

One aspect of the invention is directed to a large scale cell image analysis method. The method includes the following steps: obtaining a cell image; performing a region segmentation process; and performing a feature calculation process. The region segmentation process includes the following steps: performing a statistical intensity algorithm according to the cell image to calculate a first threshold and a second threshold; dividing the cell image into a background region and a cell region according to the first threshold; performing an average intensity process according to the cell region to calculate a third threshold and a fourth threshold; and dividing the cell region into a cytoplasmic region and a nucleus region according to the third threshold and the fourth threshold. The feature calculation process calculates at least one feature at least according to the cell region, the nucleus region, and the cytoplasmic region. At least one feature includes a ratio of an area of the nucleus region and an area of the cell region.

In accordance with one or more embodiments of the invention, the cell image is a large scale cell image, and a pixel size of the cell image is 1024×1024 or 2048×2048.

In accordance with one or more embodiments of the invention, the statistical intensity algorithm is Otsu's double thresholding algorithm. The first threshold and the second threshold are configured to divide the cell image into the background region, a cytoplasmic portion, and a nucleus portion. The cell region includes the cytoplasmic portion and the nucleus portion.

In accordance with one or more embodiments of the invention, the average intensity process uses Robust Low-Intensity Segmentation (RLIS) algorithm to distinguish the nucleus region from the cell region. The third threshold is an average intensity of plural pixels of the cell region. The fourth threshold is an average intensity of plural neighboring pixels adjacent to each of the pixels of the cell region.

In accordance with one or more embodiments of the invention, the method further includes the following step: performing a contour optimization process before performing the feature calculation process. The contour optimization process corresponds to Adaptive Non-Iterative Active Contours (ANAC) or Active Contours with discretization (ACWD).

In accordance with one or more embodiments of the invention, the method further includes the following step: performing an image classification process. At least one feature is inputted into a model to obtain a classification result. The model is a machine learning model.

In accordance with one or more embodiments of the invention, at least one feature further includes a first local average intensity difference and a second local average intensity difference. The first local average intensity difference is a sum of squares of plural first differences. The first difference is a difference of an intensity of one of plural pixels within the cytoplasmic region and an average intensity of plural neighboring pixels adjacent to one of the pixels within the cytoplasmic region. The second local average intensity difference is a sum of squares of plural second differences. The second difference is a difference of an intensity of one of plural pixels within the nucleus region and an average intensity of plural neighboring pixels adjacent to one of the pixels within the nucleus region.

Another aspect of the invention is directed to a large scale cell image analysis system. The system includes a receiving unit, a storage unit, and at least one operation unit. The receiving unit is configured to receive at least one cell image. The storage unit is configured to store at least one command. At least one operation unit is configured to execute the command, thereby executing the following steps: performing a region segmentation process; and performing a feature calculation process. The region segmentation process includes the following steps: performing a statistical intensity algorithm according to the cell image to calculate a first threshold and a second threshold; dividing the cell image into a background region and a cell region according to the first threshold; performing an average intensity process according to the cell region to calculate a third threshold and a fourth threshold; and dividing the cell region into a cytoplasmic region and a nucleus region according to the third threshold and the fourth threshold. The feature calculation process calculates at least one feature at least according to the cell region, the nucleus region, and the cytoplasmic region. At least one feature includes a ratio of an area of the nucleus region and an area of the cell region.

In accordance with one or more embodiments of the invention, the cell image is a large scale cell image, and a pixel size of the cell image is 1024×1024 or 2048×2048.

In accordance with one or more embodiments of the invention, the statistical intensity algorithm is Otsu's double thresholding algorithm. The first threshold and the second threshold are configured to divide the cell image into the background region, a cytoplasmic portion, and a nucleus portion. The cell region includes the cytoplasmic portion and the nucleus portion.

In accordance with one or more embodiments of the invention, the average intensity process uses Robust Low-Intensity Segmentation (RLIS) algorithm to distinguish the nucleus region from the cell region. The third threshold is an average intensity of plural pixels of the cell region. The fourth threshold is an average intensity of plural neighboring pixels adjacent to each of the pixels of the cell region.

In accordance with one or more embodiments of the invention, the operation unit is further configured to execute the following step: performing a contour optimization process before performing the feature calculation process. The contour optimization process corresponds to Adaptive Non-Iterative Active Contours (ANAC) or Active Contours with discretization (ACWD).

In accordance with one or more embodiments of the invention, the operation unit is further configured to execute the following step: performing an image classification process. At least one feature is inputted into a model to obtain a classification result. The model is a machine learning model.

In accordance with one or more embodiments of the invention, at least one feature further includes a first local average intensity difference and a second local average intensity difference. The first local average intensity difference is a sum of squares of plural first differences. The first difference is a difference of an intensity of one of plural pixels within the cytoplasmic region and an average intensity of plural neighboring pixels adjacent to one of the pixels within the cytoplasmic region. The second local average intensity difference is a sum of squares of plural second differences. The second difference is a difference of an intensity of one of plural pixels within the nucleus region and an average intensity of plural neighboring pixels adjacent to one of the pixels within the nucleus region.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

It will be understood that, although the terms "first," "second," and "third" may be used herein to describe various elements, components, areas, layers and/or regions, these elements, components, areas, layers and/or regions, should not be limited by these terms. These terms are only used to distinguish elements, components, areas, layers and/or regions.

Figure 1:
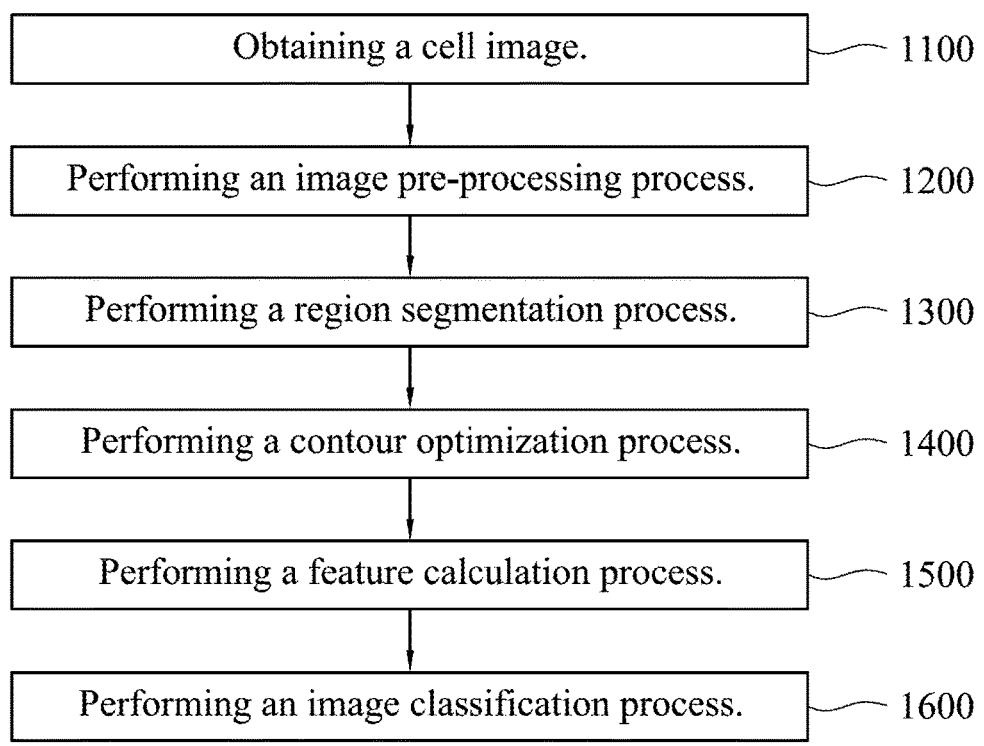
FIG. 1 is a flow chart showing a large scale cell image analysis method according to an embodiment of the present invention.

FIG. 1 is a flow chart showing a large scale cell image analysis method 1000 according to an embodiment of the present invention. The large scale cell image analysis method 1000 includes plural steps. In step 1100, a cell image is obtained. In step 1200, an image pre-processing process is performed. In step 1300, a region segmentation process is performed. In step 1400, a contour optimization process is performed. In step 1500, a feature calculation process is performed. In step 1600, an image classification process is performed.

In the embodiment of the present invention, the cell image obtained in step 1100 is a large scale cell image, such as the cell image with 1024×1024 or 2048×2048 pixel size. For example, when the large scale cell image analysis method 1000 is applied to the screening of cervical cancer, the cell image obtained in step 1100 is a divided part of an image of a single cervical sampling slide, or the cell image obtained in step 1100 is a stitchable image which is a portion region of a single cervical sampling slide captured by a high-power optical microscope. It is noted that the large scale cell image analysis method 1000 is not limited to be applied to the screening of cervical cancer, but also can be applied to the analysis of other cell images.

It is worth mentioning that the conventional computer-assisted imaging method needs a medical staff to select the regions of interest (ROI) or the regions having potential abnormality at first, thereby analyzing the selected region. Therefore, the conventional computer-assisted imaging method needs to manually select the regions or manually adjust plural parameters. In contrast, the large scale cell image analysis method 1000 of the present invention analyzes a complete and large scale cell image obtained in step 1100. The whole procedures of the large scale cell image analysis method 1000 are automatic and suitable to be applied to analysis of panorama image synthesized by a stitching method. Specifically, the large scale cell image analysis method 1000 of the present invention analyzes a complete cell image obtained by capturing or inputting. The large scale cell image analysis method 1000 of the present invention does not analyze the selected regions or even single cells. Therefore, the large scale cell image analysis method 1000 of the present invention can reduce the high risk of the tradition method due to human misjudgment or neglection.

Figure 2:
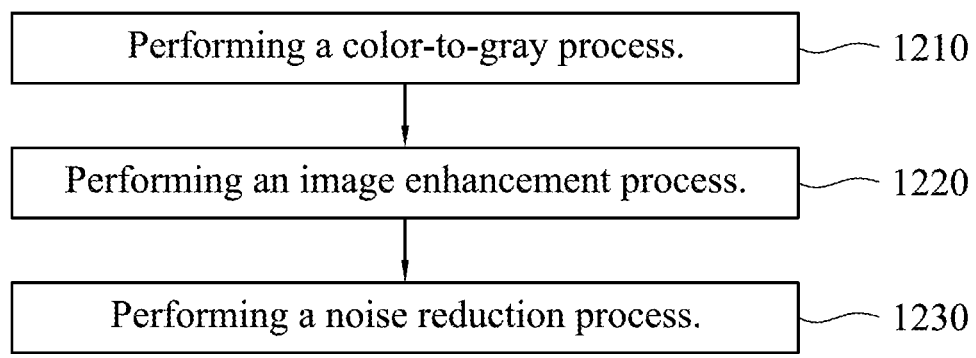
FIG. 2 is a flow chart showing the step of the large scale cell image analysis method according to the embodiment of the present invention.

In the embodiment of the present invention, in step 1200, an image pre-processing process is performed according to the cell image obtained in step 1100. FIG. 2 is a flow chart showing the step 1200 of the large scale cell image analysis method 1000 according to the embodiment of the present invention. The step 1200 includes plural steps. In step 1210, a color-to-gray process is performed. In step 1220, an image enhancement process is performed. In step 1230, a noise reduction process is performed.

In the embodiment of the present invention, in step 1210, a color image which is the cell image obtained in step 1100 is converted into a grayscale image. It is noted that the present invention does not limit the method of converting the color image into the grayscale image, and the method of converting the color image into the grayscale image may be a common or known method.

In the embodiment of the present invention, in step 1220, an image enhancement process is performed to enhance an image contrast of the cell image. The image enhancement process may be executed by Histogram Equalization (HE) algorithm, Adaptive Histogram Equalization (AHE) algorithm, or Contrast Limited Adaptive Histogram Equalization (CLAHE) algorithm. It is worth mentioning that CLAHE algorithm preserves the effect of AHE algorithm and further limits the enhancement of the slight noise, thereby making the image clearer. Therefore, the step 1220 using CLAHE algorithm has a better effect of image enhancement.

In the embodiment of the present invention, in step 1230, a noise reduction process is performed. The noise reduction process may be executed by Bilateral Filter algorithm, thereby maintaining plural edges of the image to be clear and reducing noise of the image. It is worth mentioning that the steps 1210, 1220, and 1230 are configured to perform the image pre-processing process according to the cell image obtained in step 1100, thereby making a better efficiency or a better result for subsequent analysis of the cell image. Therefore, regarding the present invention, the steps 1210, 1220, or 1230 are substantially optional steps. In actual application, the user may decide whether executing steps 1210, 1220, or 1230 according to actual demands.

As shown in FIG. 1, in the embodiment of the present invention, in step 1300, the region segmentation process is performed. The region segmentation process includes two stages: (a) a statistical intensity algorithm is performed according to the cell image to calculate a first threshold and a second threshold; the cell image is divided into a background region and a cell region according to the first threshold; (b) an average intensity process is performed according to a cell region to calculate a third threshold and a fourth threshold; the cell region is divided into a cytoplasmic region and a nucleus region according to the third threshold and the fourth threshold.

In general, the so-called binarization is to divide the image into an interested region (foreground) and an uninterested region (background). The condition of segmentation corresponds to an intensity which is called a threshold. The intensity of each of plural pixels of the foreground exceeds the threshold. The intensity of each of the pixels of the background does not exceed the threshold. The threshold may be a fixed threshold or an adaptive threshold. Otsu's double thresholding algorithm is one of the methods for calculating the adaptive threshold. Furthermore, in general, the cell image may be divided into a background region, a cytoplasmic portion, and a nucleus portion. Therefore, the region segmentation of the cell image may be performed according to the method of double thresholding.

In the embodiment of the present invention, in stage (a) of the region segmentation process, the statistical intensity algorithm is based on the Otsu's double thresholding algorithm. The first threshold and the second threshold are calculated according to the histogram of the cell image and assignment of double thresholding. The first threshold and the second threshold are configured to divide the cell image into the background region, the cytoplasmic portion, and the nucleus portion. The cell region includes the cytoplasmic portion and the nucleus portion. Therefore, the cell image may be divided into the background region and the cell region according to the first threshold corresponding to larger intensity. It is worth mentioning that, in order to improve the calculation speed, the statistical intensity algorithm of the present invention corresponds to the matrix operation and is based on Otsu's double thresholding algorithm, thereby calculating the first threshold and the second threshold.

The calculation flow of the stage (a) of the region segmentation process is described below. A histogram H of the grayscale image is calculated according to the intensity m (from 0 to $\iota_{max}=255$) of the grayscale image. The histogram H and an expected intensity histogram $H_E(m)=H(m) \times m$ may be accumulated into histogram $C_H$ and histogram $C_{HE}$, respectively. A second threshold vector $\tau_{T0}$ and a first threshold vector $\tau_{T1}$ may be represented as:

$$\tau_{T0}=[\alpha_0,\alpha_1,\ldots,\alpha_n,\ldots,\alpha_{254}], \alpha_n=[n,\ldots,n] \in \mathfrak{R}^{1\times(255-n)} \quad (1)$$

$$\tau_{T1}=[\beta_0,\beta_1,\ldots,\beta_n,\ldots,\beta_{254}], \beta_n=[n+1, n+2,\ldots,255] \in \mathfrak{R}^{1\times(255-n)} \quad (2)$$

Then, histogram $C_{HE}$ may be divided into three parts:

$$\begin{bmatrix}\mu_{E0}\\ \mu_{E1}\\ \mu_{E2}\end{bmatrix}=\left(\begin{bmatrix}C_{HE}(\tau_{T0})\\ C_{HE}(\tau_{T1})\\ C_{HE}(\iota_{max})J_{1,\lambda_\tau}\end{bmatrix}-\begin{bmatrix}0_{1,\lambda_\tau}\\ C_{HE}(\tau_{T0})\\ C_{HE}(\tau_{T1})\end{bmatrix}\right)/\left(\begin{bmatrix}\omega_0\\ \omega_1\\ \omega_2\end{bmatrix}\right) \quad (3)$$

$\mu_{E0}$, $\mu_{E1}$, and $\mu_{E2}$ represent their expected intensity of the three parts. J is a matrix composed of the expected intensity.

$$\lambda_\tau=\left[\frac{(\iota_{max}+1)\times \iota_{max}}{2}\right]$$

represents the length of $\tau_{T0}$ and the length of $\tau_{T1}$. $\omega_0$, $\omega_1$, $\omega_2$ are the weights for each of the three parts:

$$\begin{bmatrix}\omega_0\\ \omega_1\\ \omega_2\end{bmatrix}=\begin{bmatrix}C_H(\tau_{T0})\\ C_H(\tau_{T1})\\ C_H(\iota_{max})J_{1,\lambda_\tau}\end{bmatrix}-\begin{bmatrix}0_{1,\lambda_\tau}\\ C_H(\tau_{T0})\\ C_H(\tau_{T1})\end{bmatrix} \quad (4)$$

Then, the variance v of $\mu_{E0}$, $\mu_{E1}$, and $\mu_{E2}$ is calculated:

$$v=\omega_0(\mu_{E0}-\bar{\mu}_E)^2+\omega_1(\mu_{E1}-\bar{\mu}_E)^2+\omega_2(\mu_{E2}-\bar{\mu}_E)^2 \quad (5)$$

$$\bar{\mu}_E=\frac{C_{HE}(\iota_{max})}{C_H(\iota_{max})}$$

is the average of the expected intensity of the grayscale image. $\tau_{T1}(n')$ is the first threshold, $\tau_{T0}(n')$ is the second threshold, n' is an integer that maximizes variance v(n').

In the embodiment of the present invention, in stage (b) of the region segmentation process, the average intensity process uses Robust Low-Intensity Segmentation (RLIS) algorithm to calculate the third threshold and the fourth threshold, thereby distinguishing the nucleus region from the cell region. Specifically, the third threshold (global average intensity) is an average intensity of plural pixels of the cell region distinguished from stage (a) of the region segmentation process. The fourth threshold (local average intensity) is an average intensity of plural neighboring pixels adjacent to each of the pixels of the cell region. Then, the pixels within the cell region having the intensity both lower than the third threshold and the fourth threshold correspond to the nucleus region, otherwise, correspond to the cytoplasmic region. That is, the third threshold and the fourth threshold are used to divide the cell region into the cytoplasmic region and the nucleus region.

The calculation flow of stage (b) of the region segmentation process is described as follows:

$$S = \{(x, y): I_{gray}(x, y) < \tau\} \qquad (6)$$

$$\tau' = \frac{\sum I_{gray}(S)}{|S|} \qquad (7)$$

$$I_{dark}(S) = \begin{cases} 1, & \text{if } I_{gray}(S) \le I_\mu(S, k), I_{gray}(S) \le \tau' \\ 0, & \text{else} \end{cases} \qquad (8)$$

$$I_{dark}(S') = 0 \qquad (9)$$

S is a coordinate set of $I_{gray}$. The intensity of $I_{gray}$ is lower than the third threshold $\tau$. $I_\mu$ is an image blurred by a k×k mean filter at coordinate set S. If the intensity values of coordinate set S are not greater than $I_\mu(S,k)$ and the fourth threshold $\tau'$, it is set to 1 in the binary image, otherwise, it is set to 0 in the binary image $I_{dark}$. Thus, the binary image $I_{dark}$ may be obtained. The contours of $I_{dark}$ are the contours of the nucleus region.

As shown in FIG. 1, in the embodiment of the present invention, in step 1400, the contour optimization process is performed. The contour optimization process corresponds to Adaptive Non-Iterative Active Contours (ANAC) or Active Contours with discretization (ACWD).

The calculation flow of Adaptive Non-Iterative Active Contours (ANAC) is described as follows, $$M(x, y) = \begin{cases} 1, & \text{if } (x, y) \in S_i \\ 0, & \text{else} \end{cases} \qquad (10)$$

$$\gamma(x, y) = \begin{cases} 1, & \text{if } M(x, y) - M_\mu(x, y, k) \ne 0 \\ 0, & \text{else} \end{cases} \qquad (11)$$

$$\varepsilon = \gamma[\sigma_0(I_{gray} - \mu_i)^2 - \sigma_i(I_{gray} - \mu_0)^2] \qquad (12)$$

$$M'(x, y) = \begin{cases} 1, & \text{if } \varepsilon(x, y) < 0 \\ 0, & \text{if } \varepsilon(x, y) > 0 \\ M(x, y), & \text{else} \end{cases} \qquad (13)$$

$S_i$ is a coordinate set of the initial contours of the cell region or the nucleus region. $M_\mu(x,y,k)$ is the inside pixel $M(x,y)$ blurred by a k×k mean filter, the inside pixel $M(x,y)$ corresponds to the pixels inside the initial contours. $\sigma_i$ is the standard deviation of intensity values inside the initial contours. $\mu_i$ is the average of intensity values inside the initial contours. $\sigma_0$ is the standard deviation of intensity values outside the initial contours. $\mu_0$ is the average of intensity values outside the initial contours. The inside pixel $M(x,y)$ is set to 1, and the difference $\gamma(x,y)$ between $M(x,y)$ and $M_\mu(x,y,k)$ is calculated. $\varepsilon$ represents the evaluation function, and it is always 0 if the pixel is not on an edge. The evaluation function measures the square of differences from the pixel intensity values and averages. The standardization with the standard deviation is performed to achieve automatic weighting. When $\varepsilon$ is smaller than 0, M'(x,y) is equal to 1. Finally, the contours of M'(x,y) are the optimized contours.

The calculation flow of Active Contours with discretization (ACWD) is described as follows, an outward unit normal vector $\hat{N}(i)$ is calculated:

$$\hat{N}(i) = (\hat{N}_x(i), \hat{N}_y(i)) = \frac{(-T_y(i), T_x(i))}{\|\vec{T}(i)\|} \qquad (14)$$

$$\vec{T}(i) = (T_x(i), T_y(i)) = C_t(i + k_s) - C_t(i - k_s) \qquad (15)$$

$\vec{T}(i)$ is a tangent of the coordinate $C_t(i)$ of the initial contour, and $k_s$ controls the smoothness. $d=d_i+d_o$ is defined, $d_i$ is an inward distance, $d_o$ is an outward distance. According to the center $C_t(i)$, the pixels R(i,j) on $\hat{N}(i)$ and their intensity $\iota(i,j)$ are calculated:

$$R(i, j) = \begin{bmatrix} R_x(i, j) \\ R_y(i, j) \end{bmatrix} = \begin{bmatrix} \hat{N}_x(i) \\ \hat{N}_y(i) \end{bmatrix} j + \begin{bmatrix} C_{t_x}(i) \\ C_{t_y}(i) \end{bmatrix}, 0 \le j \le d \qquad (16)$$

$$\iota(i, j) = I_{gray}(R_x(i, j), R_y(i, j)) \qquad (17)$$

In order to prevent the influence from the outlier, $\iota$ is adjusted to $\iota'$:

$$\Delta\iota(i) = \iota(i, j+1) - \iota(i, j) \qquad (18)$$

$$\Delta\iota'(i, j) = \begin{cases} 0, & \text{if } \sigma_\iota > 0, \Delta\iota(i, j) < 0 \\ 0, & \text{if } \sigma_\iota < 0, \Delta\iota(i, j) > 0 \\ \Delta\iota(i), & \text{else} \end{cases} \qquad (19)$$

$$\iota'(i, j) = \iota(i, 0) + \sum_{j=0}^{j} \Delta\iota'(i, \tilde{j}) \qquad (20)$$

$\sigma_\iota$ is the summation of $\Delta\iota$. If $\sigma_\iota$ is larger than 0, the intensity inside the contour is higher than the intensity outside the contour. After obtaining $\iota'$, the coordinate $C'_t(i)$ of the best contour is calculated by discretization with an approach similar to Otsu's double thresholding algorithm:

$$C_t(i, j) = \sum_{j=0}^{j} \iota'(i, \tilde{j}) \qquad (21)$$

$$\begin{bmatrix} \mu_0(i, j) \\ \mu_1(i, j) \end{bmatrix} = \left( \begin{bmatrix} C_t(i, j) \\ C_t(i, d) \end{bmatrix} - \begin{bmatrix} 0 \\ C_t(i, j) \end{bmatrix} \right) / \begin{bmatrix} j \\ d - j \end{bmatrix} \qquad (22)$$

$$v(i, j) = j(\mu_0(i, j) - \bar{\mu}(i))^2 + (d - j)(\mu_1(i, j) - \bar{\mu}(i))^2 \qquad (23)$$

$$C'_t(i) = (R_x(i, j'), R_y(i, j')), j' : v(i, j') = \max(v(i)_{1,d+1}) \qquad (24)$$

$\bar{\mu}(i)$ is the average of $\iota'(i)$. The pixels inside $C'_t$ are marked as 1 in another binary image. Then, these pixels are adjusted by mathematical morphology. The contours corresponding to the pixels marked as 1 in the binary image are the optimized contours.

As shown in FIG. 1, in the embodiment of the present invention, in step 1500, the feature calculation process is performed. The feature calculation process calculates at least one feature. For example, one feature may be a ratio of an area of the nucleus region and an area of the cell region. The area of the nucleus region is obtained according to the contours of the nucleus region of the large scale cell image. The area of the cell region is obtained according to the contours of the cell region of the large scale cell image. It is worth mentioning that the embodiment of the present invention calculates the ratio of the area of the nucleus region and the area of the cell region within the large scale cell image.

In contrast, the ratio of the area of the nucleus region and the area of the cell region of the traditional analysis method corresponds to selected partial regions or single cells. Therefore, the method of the present invention may effective reducing traditional judgement error due to overlap of the cells or over-intensive cells.

For example, two other features of step 1500 may be a first local average intensity difference and a second local average intensity difference. The first local average intensity difference is a sum of squares of plural first differences. The first difference is a difference of an intensity of one of plural pixels within the cytoplasmic region and an average intensity of plural neighboring pixels adjacent to one of the pixels within the cytoplasmic region. The second local average intensity difference is a sum of squares of plural second differences. The second difference is a difference of an intensity of one of plural pixels within the nucleus region and an average intensity of plural neighboring pixels adjacent to one of the pixels within the nucleus region. The first local average intensity difference and the second local average intensity difference may represent the texture features of the cytoplasmic region and the nucleus region.

As shown in FIG. 1, in the embodiment of the present invention, in step 1600, the image classification process is performed. At least one feature calculated in step 1500 is inputted into a model to obtain a classification result. The model is a machine learning model. For example, the ratio of the area of the nucleus region and the area of the cell region is inputted into the machine learning model to obtain the classification result. The classification result is a predicted result configured to predict the cell image obtained in step 1100 corresponding to the normal cells or the cancerous cells. The medical staffs may make the pre-judgement based on the classification result. Specifically, the large scale cell image analysis method 1000 may be configured to assist the medical staffs to make the pre-judgement. For example, using the ratio of the area of the nucleus region and the area of the cell region to judge the cell image corresponding to the normal cells or the cancerous cells may not be precise enough, thus other judgement condition may be used. In another embodiment of the present invention, the first local average intensity difference, the second local average intensity difference, and the ratio of the area of the nucleus region and the area of the cell region are inputted into the machine learning model to obtain the classification result. The classification result is configured to predict the cell image obtained in step 1100 corresponding to the normal cells or the cancerous cells.

It is worth mentioning that the cell image obtained in step 1100 may be the known normal cell image or known abnormal cancerous cell image. The model in step 1600 may be trained through inputting plural normal cell images and plural abnormal cancerous cell image, thereby improving the reliability of the model in step 1600.

The large scale cell image analysis system is also disclosed in the present invention. The large scale cell image analysis system includes a receiving unit, a storage unit, and at least one operation unit. The receiving unit is configured to receive at least one cell image. The storage unit is configured to store at least one command. At least one operation unit is configured to execute at least one command based on at least one cell image received by the receiving unit. At least one command corresponds to steps 1200-1600 of the large scale cell image analysis method 1000. Specifically, the large scale cell image analysis system is a system implemented based on the large scale cell image analysis method 1000, thus the descriptions of the commands of operation unit are not repeated here to avoid duplicity. It is worth mentioning that the large scale cell image analysis system is implemented in Python (ver. 3.5) with a 3.4 GHz clock rate CPU and executed with a single thread. The large scale cell image analysis system may complete the classification result for one cell image with 2048×2048 pixel size within one second.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A large scale cell image analysis method, comprising:
obtaining a cell image;
performing a region segmentation process, comprising:
   performing a statistical intensity algorithm according to the cell image to calculate a first threshold and a second threshold;
   dividing the cell image into a background region and a cell region according to the first threshold;
   performing an average intensity process according to the cell region to calculate a third threshold and a fourth threshold; and
   dividing the cell region into a cytoplasmic region and a nucleus region according to the third threshold and the fourth threshold; and
performing a feature calculation process, comprising:
   calculating at least one feature at least according to the cell region, the nucleus region, and the cytoplasmic region, wherein at least one feature includes a ratio of an area of the nucleus region and an area of the cell region;
wherein the average intensity process uses Robust Low-Intensity Segmentation (RLIS) algorithm to distinguish the nucleus region from the cell region, wherein the third threshold is an average intensity of a plurality of pixels of the cell region, wherein the fourth threshold is an average intensity of a plurality of neighboring pixels adjacent to each of the pixels of the cell region.

2. The large scale cell image analysis method of claim 1, wherein the cell image is a large scale cell image, wherein a pixel size of the cell image is 1024×1024 or 2048×2048.

3. The large scale cell image analysis method of claim 1, wherein the statistical intensity algorithm is Otsu's double thresholding algorithm, wherein the first threshold and the second threshold are configured to divide the cell image into the background region, a cytoplasmic portion, and a nucleus portion, wherein the cell region comprises the cytoplasmic portion and the nucleus portion.

4. The large scale cell image analysis method of claim 1, further comprising:
performing a contour optimization process before performing the feature calculation process, wherein the contour optimization process corresponds to Adaptive Non-Iterative Active Contours (ANAC) or Active Contours with discretization (ACWD).

5. The large scale cell image analysis method of claim 1, further comprising:

performing an image classification process, wherein at least one feature is inputted into a model to obtain a classification result, wherein the model is a machine learning model.

6. The large scale cell image analysis method of claim 1, wherein at least one feature further comprises a first local average intensity difference and a second local average intensity difference,
   wherein the first local average intensity difference is a sum of squares of a plurality of first differences, wherein the first difference is a difference of an intensity of one of a plurality of pixels within the cytoplasmic region and an average intensity of a plurality of neighboring pixels adjacent to one of the pixels within the cytoplasmic region;
   wherein the second local average intensity difference is a sum of squares of a plurality of second differences, wherein the second difference is a difference of an intensity of one of a plurality of pixels within the nucleus region and an average intensity of a plurality of neighboring pixels adjacent to one of the pixels within the nucleus region.

7. A large scale cell image analysis system, comprising:
   a receiving circuit, configured to receive at least one cell image;
   a storage circuit, configured to store at least one command; and
   at least one operation circuit, configured to execute the command, thereby executing the following steps:
      performing a region segmentation process, comprising:
         performing a statistical intensity algorithm according to the cell image to calculate a first threshold and a second threshold;
         dividing the cell image into a background region and a cell region according to the first threshold;
         performing an average intensity process according to the cell region to calculate a third threshold and a fourth threshold; and
         dividing the cell region into a cytoplasmic region and a nucleus region according to the third threshold and the fourth threshold; and
      performing a feature calculation process, comprising:
         calculating at least one feature at least according to the cell region, the nucleus region, and the cytoplasmic region, wherein at least one feature includes a ratio of an area of the nucleus region and an area of the cell region;
   wherein the average intensity process uses Robust Low-Intensity Segmentation (RLIS) algorithm to distinguish the nucleus region from the cell region, wherein the third threshold is an average intensity of a plurality of pixels of the cell region, wherein the fourth threshold is an average intensity of a plurality of neighboring pixels adjacent to each of the pixels of the cell region.

8. The large scale cell image analysis system of claim 7, wherein the cell image is a large scale cell image, wherein a pixel size of the cell image is 1024×1024 or 2048×2048.

9. The large scale cell image analysis system of claim 7, wherein the statistical intensity algorithm is Otsu's double thresholding algorithm, wherein the first threshold and the second threshold are configured to divide the cell image into the background region, a cytoplasmic portion, and a nucleus portion, wherein the cell region comprises the cytoplasmic portion and the nucleus portion.

10. The large scale cell image analysis system of claim 7, wherein the operation circuit is further configured to execute the following step:
   performing a contour optimization process before performing the feature calculation process, wherein the contour optimization process corresponds to Adaptive Non-Iterative Active Contours (ANAL) or Active Contours with discretization (ACWD).

11. The large scale cell image analysis system of claim 7, wherein the operation circuit is further configured to execute the following step:
   performing an image classification process, wherein at least one feature is inputted into a model to obtain a classification result, wherein the model is a machine learning model.

12. The large scale cell image analysis system of claim 7, wherein at least one feature further comprises a first local average intensity difference and a second local average intensity difference,
   wherein the first local average intensity difference is a sum of squares of a plurality of first differences, wherein the first difference is a difference of an intensity of one of a plurality of pixels within the cytoplasmic region and an average intensity of a plurality of neighboring pixels adjacent to one of the pixels within the cytoplasmic region;
   wherein the second local average intensity difference is a sum of squares of a plurality of second differences, wherein the second difference is a difference of an intensity of one of a plurality of pixels within the nucleus region and an average intensity of a plurality of neighboring pixels adjacent to one of the pixels within the nucleus region.

* * * * *